United States Patent Office 3,631,125
Patented Dec. 28, 1971

3,631,125
ADDUCTS OF m-TOLYLENEDIAMINE AND
CURABLE POLYEPOXIDE COMPOSITIONS
BASED ON m-TOLYLENEDIAMINE AND ADDUCTS THEREOF
George A. Salensky, Metuchen, N.J., assignor to Union
Carbide Corporation
No Drawing. Filed Jan. 16, 1968, Ser. No. 698,140
Int. Cl. C08g 45/06, 30/08
U.S. Cl. 260—830 R                6 Claims

ABSTRACT OF THE DISCLOSURE

This invention relates to adducts of m-tolylenediamine and liquid polyglycidylethers; to adducts of m-tolylenediamine and a lactone; to curable polyepoxide compositions based on these adducts and to solid, thermosetting reaction products of m-tolylenediamine and liquid polyepoxides. These compositions and reaction products can be used to encapsulate electrical components making the components resistant to thermal and mechanical shock.

---

This invention relates to adducts of m-tolylenediamine and liquid polyglycidylethers; to adducts of m-tolylenediamine and a lactone, to curable polyepoxide compositions based on those adducts; to solid, thermosetting reaction products of liquid polyepoxides and m-tolylenediamine; and to infusible products obtained from these polyepoxide compositions and solid, thermosetting reaction products. More particularly, this invention relates to m-tolylenediamine adducts, that is addition products of m-tolylenediamine and liquid polyglycidylethers and of m-tolylenediamine and a caprolactone which, when added to polyepoxides, provide curable compositions which are characterized by relatively long shelf life and when heated at elevated temperatures, by excellent cure speed. The cured products obtained from the polyepoxide compositions and the solid, thermosetting reaction products of this invention are characterized by excellent physical properties such as flexural strength, tensile strength, impact strength and the like.

Polyepoxide compositions, such as those based on polyglycidylethers of polyhydric phenols, generally contain an aromatic, polyfunctional amine as the curing agent as the resultant compositions will cure to infusible products which are characterized by excellent physical, chemical and electrical properties. The polyglycidylethers are usually admixed with a measured amount of an aromatic, polyfunctional amine ranging from about 90 percent of stoichiometric to about 15 percent in excess of stoichiometric and the compositions utilized as desired, for example, in molding applications. Because of the high reactivity of these polyfunctional amines toward the polyglycidylethers, however, these compositions "fast cure" that is, these compositions cure to infusible products in a relatively short period of time.

The problem of "fast cure" has presented many obvious difficulties since it is not always possible to use these polyglycidylether compositions immediately upon formulation. In most instances, these polyglycidylether compositions cure before they can be used in the desired manner.

Various suggestions have been made for the purpose of improving the relatively poor storage life of curable polyepoxide compositions. For example, it has been suggested to add to polyepoxide compositions a compound which is unreactive per se, but one which under the impetus of heat will become activated and react with the polyepoxides with the result that the compositions will cure to infusible products. Latent acting compounds, particularly of the type described, have proved to be undesirable because of the uncertainty and unpredictability of the "activation reaction." As an illustration a small variation in the amount of heat imparted to the compositions during the "activation cycle" can seriously affect the extent to which the "activation reaction" proceeds and consequently, the amount of activated compound formed.

The present invention provides:

(1) Solid, thermosetting reaction products of liquid polyepoxides and m-tolylenediamine;

(2) Adducts of m-tolylenediamine and liquid polyglycidylethers;

(3) Adducts of m-tolylenediamine and a lactone; these adducts on being added to polyepoxides providing:

(4) Curable polyepoxide compositions which are characterized by relatively long shelf life and by excellent cure speed when heated at elevated temperatures, these properties also characterizing the solid, thermosetting reaction products of (1) and the curable polyepoxide compositions of (4) curing to:

(5) Infusible products which are characterized by excellent physical properties.

The term "m-tolylenediamine" as used herein encompasses 3,5-diaminotoluene, 2,4-diaminotoluene, 2,6-diaminotoluene and mixtures thereof.

Polyglycidylethers which are reacted with m-tolylenediamine to provide adducts as defined in (2) above, are those compounds which are liquid at room temperature about 23° C. and have an epoxy equivalency of greater than one. Among such polyglycidylethers can be noted the polyglycidylethers of polyhydric phenols exemplified by the polyglycidylethers of such phenols as the mononuclear polyhydric phenols, resorcinol, and pyrogallol, and the diol polynuclear phenols such as the bis-phenols described in Bender et al. U.S. Pat. 2,506,486.

The phenols may contain substituents such as alkyl or aryl ring substituents or halogens, as exemplified by the alkyl resorcinols, tribromoresorcinols and the diphenols containing alkyl and halogen substituents on the aromatic ring (Bender et al. U.S. Pat. 2,506,486). The polyhydric polynuclear phenols can consist of two or more phenols connected by such groups as methylene, alkylene or sulfone. The connecting groups are further exemplified by bis(p-hydroxyphenyl)methane, 2,2-bis(p-hydroxyphenyl)propane and dihydroxydiphenyl sulfone.

Process for the preparation of polyglycidylethers of polyhydric phenols is described in detail in the Bender et al. patent (supra) and U.S. Pat. 2,943,095 to A. G. Farnham et al.

Particularly desirable for purposes of this invention are the polyglycidylethers of the bis(hydroxyphenyl)alkanes, as for example, the diglycidyl ether of 2,2-bis(p-hydroxyphenyl)propane. Other suitable polyglycidylethers of polyhydric phenols are enumerated in U.S. Pat. 2,633,-458 to E. C. Shokal.

Also suitable are the polyglycidylethers of polyhydric alcohols such as the reaction products of epichlorohydrin and aliphatic compounds containing two to four hydroxyl groups such as ethylene glycol, propane diols, butane diols, glycerine, hexane triols and the like. Methods of preparing polyglycidylethers of polyhydric alcohols are described in U.S. Pat. 2,898,349 to P. Zuppinger et al.

Among suitable lactones which are reacted with m-tolylenediamine to provide adducts defined in (3) above are those compounds which have the formula:

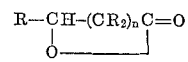

where $n$ is an integer having a value of 1 to 10 inclusive preferably 4 to 6 inclusive, each R, which can be the same or different, is hydrogen or a monovalent hydrocarbon radical such as alkyl, alkoxy, cycloaliphatic, aryloxy or aryl radicals, wherein each radical contains a maximum of 12 carbon atoms and preferably a maximum of 6 carbon atoms. Illustrative of suitable radicals for R are the following: alkyl radicals such as methyl, ethyl, n-propyl, 2-ethylhexyl, dodecyl and the like; alkoxy radicals such as methoxy, ethoxy, n-propoxy, n-hexoxy, n-dodecoxy and the like; cycloaliphatic radicals such as cyclopentyl, cyclohexyl and the like; aryl radicals such as phenyl, ethylphenyl, n-propylphenyl, n-butylphenyl and the like; aryloxy radicals such as phenoxy, n-propylphenoxy, n-butylphenoxy, and the like.

Particularly desirable lactones are the caprolactones which have the formula:

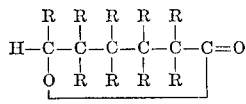

wherein at least six of the R's are hydrogen with the remainder as previously defined. Other suitable lactones are described in U.S. Pat. 3,169,945 to F. Hostettler et al.

In preparing the adducts (2) of this invention, it is convenient to first pulverize the solid m-tolylenediamine and to then react the pulverized m-tolylenediamine with a liquid polyglycidylether by simply admixing the two reactants at room temperature, about 23° C.

Although the reaction between the m-tolylenediamine and a polyglycidylether to form an adduct, which is brittle and fusible, that is, will not, per se, thermoset at elevated temperatures, can be carried out at room temperature, higher temperatures can be employed in order to shorten the reaction time. Generally, temperatures on the order of about 50° C. to about 150° C. and preferably on the order of about 90° C. to about 110° C. are suitable.

The amount of m-tolylenediamine used to produce the adduct is in excess of 50% of the stoichiometric amount. For purposes of stoichiometric calculations, one epoxy group is deemed to react with one aminohydrogen atom.

The preparation of adducts (3) of m-tolylenediamine and a lactone is conveniently conducted by reacting m-tolylenediamine, in a pulverized state, with a lactone at temperatures on the order of about 50° C. to about 150° C. and preferably at temperatures on the order of about 90° C. to about 110° C.

The amount of m-tolylenediamine used to prepare the adducts of (3) is in excess of the stoichiometric amount. For purposes of stoichiometric calculations, one molecule of the lactone is deemed to react with one primary amino group.

Adduct (3), as is adduct (2), is a brittle, grindable, fusible solid.

Preparation of these adducts is further described in the examples of this application.

In preparing the thermosetting, reaction products of m-tolylenediamine and a liquid polyepoxide, it is convenient to admix the two reactants to form a homogeneous mass, to form the homogeneous mass into thin sheets, generally on the order of about ¼ inch thick and allowing the reactants to undergo a reaction, preferably at room temperature, to a mass which is brittle, and which will, per se, thermoset at elevated temperatures.

The formation of the homogeneous mass into sheets can be conveniently carried out by a casting operation. After the sheeted reaction product has advanced to the thermosetting state, it is formed into particulate material by comminuting in a conventional grinding mill or micropulverizer to a micron size, preferably, on the order of about 1 to about 5 microns.

If desired, the reaction between m-tolylenediamine and a liquid polyepoxide can be carried out by simply admixing the two reactants at temperatures on the order of about 80° C. to about 110° C. and preferably on the order of about 90° C. to about 100° C. to form the thermosetting reaction products.

The amount of m-tolylenediamine used to react with the liquid polyepoxide ranges from about 90 percent of stoichiometric to about 10 percent in excess of stoichiometric. It is preferred to use about stoichiometric amounts. For purposes of stoichiometric calculations, one aminohydrogen atom is deemed to react with one epoxy group.

Liquid polyepoxides useful for being reacted with m-tolylenediamine to form suitable reaction products are described subsequently in this application.

In order to establish that the adducts of this invention are fusible, these products were subjected to the inclined plate test. In this test, ½ gram pellets, of the material to be tested, are placed on a horizontal metal plate which is at a temperature of 125° C. The plate is kept at a horizontal position for one minute after which the plate, with the pellet still in place, is inclined at an angle of 45 degrees and kept in this position for 20 minutes. If the material is fusible, it will either flow or sag. If the material is infusible, it will neither flow nor sag.

The adducts of this invention have a flow or sag ranging from about 25 to 250 millimeters as determined by the inclined plate test.

The polyepoxide compositions of this invention are formulated by admixing the adducts with a polyepoxide having an epoxy equivalency of greater than one. Illustrative of suitable polyepoxides are the polyglycidylethers previously described as well as such polyepoxides as the polyglycidyl esters of polycarboxylic acids, such as the polyglycidyl esters of adipic acid, phthalic acid and the like. Polyglycidyl esters of polycarboxylic acids are described in detail in U.S. Pat. 2,870,170 to Payne et al. Also suitable are polyglycidyl compounds produced by reacting epichlorohydrin with aromatic amines, such as aniline, 2,6-dimethylaniline, p-toluidine, m-chloroaniline, p-aminodiphenyl, m-phenylene diamine, p-phenylene diamine, 4,4'-diaminophenylmethane, or with amino phenols such as p-amino phenol, 5-amino-1-n-naphthol, 2-chloro-4-amino phenol and the like. Specific compounds include among others, N,N-diglycidyl aniline, N,N-diglycidyl-2,6-dimethyl aniline, N,N,N',N'-tetraglycidyl-4,4'-diamino diphenyl methane, the triglycidyl derivative of p-amino phenol wherein the aminohydrogen and OH hydrogen atoms are replaced by glycidyl groups.

Polyglycidyl derivatives of aromatic amines and amino phenols and methods for their preparation are further described in U.S. Pats. 2,951,825 and 2,951,822 to N. H. Reinking and N. H. Reinking et al., respectively.

The so-called peracetic acid epoxides which are obtained by epoxidation across a double bond, such as bis-(2,3-epoxycyclopentyl)ether, 3,4-epoxy-6 - methylcyclohexylmethyl-3,4-epoxy-6 - methylcyclohexane carboxylate, vinyl-cyclohexene dioxide, dicyclopentadienedioxide and the like are also suitable.

Suitable liquid polyepoxides which can be reacted with m-tolylenediamine to produce the reaction products (1) of this invention are those liquid polyepoxides previously defined as well as liquid polyglycidylethers of polyhydric phenols as for example those polyhydric phenols previously enumerated in this application.

In formulating polyepoxide compositions using adducts (2) and (3), various amounts of these adducts can be used. Generally, the adducts are used in amounts such as to provide about 0.90 to about 1.10 equivalents per epoxy group and preferably about 0.95 to about 1.05 equivalents per epoxy group. For optimum results, the adducts are used in about 1 equivalent per epoxy group. For purposes of these calculations, one oxirane epoxy group

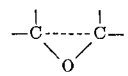

is deemed to react with one active hydrogen atom.

The polyepoxides and the adducts are combined by simply admixing the two together, generally at room temperature.

In those instances wherein the polyepoxide is a relatively low viscosity liquid, it is admixed directly with the adduct. In all other instances, it is convenient to fluidize the adducts by heat and admix the fluid adduct and the desired polyepoxide.

Additional materials such as fillers, pigments, fibers, dyes, accelerators which decrease the time of the curing cycle such as tertiary amines, hydroxides, phenols, phenolic novolacs, acids and the like can be added to the polyepoxide compositions and to the reaction products of this invention, if so desired. Also ascorbic acid can be used with the m-tolylenediamine to suppress the discoloration thereof.

In order to cure the polyepoxide compositions and the reaction products of this inveniton to infusible products, it is customary to heat these materials at elevated temperatures, generally on the order of about 60° C. to about 200° C. for a period of time ranging from about 1 to 3 hours. The actual heating cycle will depend upon the material being cured. Room temperature curing, about 23° C. can be effected but generally this takes a number of days.

The compositions and reaction products of this invention can be formed into many useful articles as for example, electrical castings and can be used to encapsulate electrical components making these components resistant to thermal and mechanical shock.

The examples which follow are intended to further illustrate the present invention without limiting the scope thereof in any manner.

EXAMPLE 1

Preparation of an adduct of 2,4-diaminotoluene and liquid diglycidylether of 2,2-bis(p-hydroxyphenyl)propane.

95 grams of 2,4-diaminotoluene and 5 grams of liquid diglycidylether of 2,2-bis(p-hydroxyphenyl)propane were admixed at room temperature, heated to 100° C., maintained at 100° C. for 1 hour and then allowed to cool to room temperature.

The adduct was a brittle, grindable fusible solid which had a flow of 250 millimeters as determined by the inclined plate test.

EXAMPLE 2

Preparation of an adduct of 2,6-diaminotoluene and liquid diglycidylether of 2,2-bis(p-hydroxyphenyl)propane.

95 grams of 2,6-diaminotoluene and 5 grams of liquid diglycidylether of 2,2-bis(p-hydroxyphenyl)propane were admixed at room temperature, heated to 100° C., maintained at 100° C. for 1 hour and then allowed to cool to room temperature.

The adduct was a brittle, grindable, fusible solid which had a flow of 250 millimeters as determined by the inclined plate test.

EXAMPLE 3

Preparation of an adduct of 2,4-diaminotoluene and ε-caprolactone.

95 grams of 2,4-diaminotoluene and 5 grams of ε-caprolactone were admixed at room temperature, heated to 100° C., maintained at 100° C. for 1 hour and then allowed to cool to room temperature.

The adduct was a brittle, grindable, fusible solid which had a flow of 250 millimeters as determined by the inclined plate test.

Compositions, the formulations of which are noted in Table I, were prepared as described below and subjected to various tests. In each case, the compositions were prepared by melting the phenolic novolac and admixing it with the diglycidylether of 2,2-bis(p-hydroxyphenyl)propane. The mixture was heated to a temperature of 50° C. and melted hardener added thereto. The same equivalent amount of hardener was used in each instance. Silica flour and zinc stearate were added and the resultant mixture subjected to a ten minute mixing cycle, including a two-minute deaeration cycle, in a Baker Perkins dispersion type mixer. Each composition was spread out on an open tray to a thickness of one-half inch. The trays were allowed to stand overnight at room temperature, about 23° C., with the result that each thermosetting composition advanced to a brittle grindable state. Each composition was then granulated before being tested.

The phenolic novolac was a phenol-formaldehyde novolac resin having a molecular weight of about 600 and having 6 phenolic hydroxyl groups per molecule. The "hardeners" in Table I are identified by an asterisk.

Composition C was actually a thermosetting reaction product of the diglycidyl ether and 2,6-diaminotoluene.

TABLE I—COMPOSITIONS IN PARTS BY WEIGHT

| | Control 1 | Control 2 | A | B | C |
|---|---|---|---|---|---|
| Diglycidylether of 2,2-bis(p-hydroxypheynl)propane having an epoxy assay of 183 grams/gram mole epoxy | 183.0 | 183.0 | 183.0 | 183.0 | 183.0 |
| Phenolic novolac | 9.5 | 9.5 | 9.5 | 9.5 | 9.5 |
| Adduct of Example 1* | | | 31 | | |
| Adduct of Example 3* | | | | 32 | |
| 2,6-diaminotoluene* | | | | | 29.0 |
| 4,4'-diaminodiphenyl methane* | 50.0 | | | | |
| m-phenylenediamine* | | 25.7 | | | |
| Silica flour | 654.0 | 590.0 | 604.0 | 608.0 | 599.0 |
| Zinc stearate | 9.0 | 8.1 | 8.3 | 8.3 | 8.2 |
| Flexural strength, p.s.i. (ASTMD-790-66) | 5,900 | (¹) | 16,300 | 10,000 | 14,900 |

¹ Not measurable since composition cured too rapidly.

The compositions noted in Table I were tested as to shelf life by the Spiral Fow Test described in detail in The Society of the Plastic Industry pamphlet EMM 1–66. The greater the change in Spiral Flow, from the initial Spiral Flow, the poorer the shelf life of the composition tested. The results of the Spiral Flow Tests are noted in Table II.

TABLE II

| | Control 1 | Control 2 | A | B | C |
|---|---|---|---|---|---|
| Spiral flow in inches: | | | | | |
| Initial flow | 53.5 | 31.1 | 61 | 57.25 | 40.5 |
| Aged 1 day at 77° F | 20.5 | 26.75 | 31.25 | 29 | 34.75 |
| Aged 5 days at 77° F | 14.8 | 17 | 25.25 | 22.1 | 28 |
| Aged 7 days at 77° F | 12.4 | | 22.75 | 19.1 | 16 |
| Aged 4 hours at 100° F | 12 | 4.75 | 29.75 | 25.25 | 13.25 |
| Aged 6 hours at 100° F | 8.6 | 1.5 | 23.25 | 19.50 | 10 |
| Aged 16 hours at 100° F | 4.6 | | 11.9 | 9.75 | 2.5 |
| Aged 18 hours at 100° F | 1.25 | | 10.75 | | |

The cure speed of the composition of Table I was evaluated by determining the time for each composition to reach a Shore D. Hardness of 50 when subjected to a molding cycle of 300° F. under a pressure of 900 p.s.i.g. The faster a material reached a hardness of 50, the faster cure speed it was deemed to have. The results are noted in Table III.

TABLE III.—SHORE D. HARDNESS

| Molding time at 300° F., 900 p.s.i.g. | Control 1 | A | B | C |
|---|---|---|---|---|
| 45 seconds | 22 | 20 | 23 | 23 |
| 60 seconds | 27 | 35 | 30 | 30 |
| 75 seconds | 31 | 40 | 41 | 41 |
| 90 seconds | 39 | 48 | 45 | 45 |
| 120 seconds | 44 | 52 | 49 | 49 |
| 210 seconds | 53 | 58 | 58 | 58 |
| 300 seconds | 62 | 63 | 64 | 64 |

In order to further demonstrate the excellent properties of the solid, thermosetting reaction products of this invention, 2,4-diaminotoluene was reacted with a liquid diglycidylether of 2,2-bis(p-hydroxyphenyl)propane and the resultant solid, thermosetting reaction product tested as to its physical properties.

The reaction product of 2,4-diaminotoluene and the diglycidylether was prepared as follows: The phenolic novolac (same as noted in Table I) in an amount of 9.5 parts by weight, was melted into 183 parts by weight of liquid diglycidylether (same as noted in Table 1) and 540 parts by weight of silica flour and 8.2 parts by weight zinc stearate added thereto. The materials were thoroughly mixed in a Baker Perkins dispersion type mixer and 29.3 parts by weight 2,4-diaminotoluene preblended with 55 parts by weight silica flour added thereto. The resultant mixture was subjected to a fifteen minute mixing cycle, including a two-minute deaeration cycle in the Baker Perkins mixer. The resultant composition was spread on open trays which were allowed to stand overnight at room temperature about 25° C. The solid, thermosetting grindable reaction product obtained was granulated to a micron size of about 5 microns and subjected to the tests noted in Table IV. Control 1 was also tested as indicated in Table IV.

TABLE IV

| Physical properties | Control 1 | Reaction Product |
|---|---|---|
| Flexural strength (ASTMD 790-66) p.s.i. | 5,200 | 11,700 |
| Tensile strength (ASTMD 638-64T) p.s.i. | 3,040 | 8,300 |
| Tensile modulus of elasticity (ASTMD 648-64T) p.s.i. | 1,414,000 | 1,861,000 |
| Tensile elongation (ASTMD 638-64T) percent | 0.28 | 0.50 |
| Izod impact strength (ASTMD 256-56) lb./inch of notch | 0.31 | 0.36 |
| Spiral flow in inches: | | |
| Initial flow | 51 | 59 |
| Aged 7 days at 77° F. | 21 | 45 |

It is to be understood that the disclosure of all patents and literature references noted are incorporated herein by reference.

What is claimed is:

1. A solid adduct, fusible at elevated temperatures and suitable for use as an epoxide curing agent, formed on reacting m-tolylenediamine, in excess of 50 percent of the stoichiometric amount, with a liquid polyglycidyl ether having an oxirane epoxy equivalency greater than one.

2. A curable composition comprising a polyepoxide having an oxirane epoxy equivalency greater than one and an adduct as defined in claim 1.

3. A solid, fusible adduct as defined in claim 1 wherein the liquid polyglycidyl ether is a liquid polyglycidyl ether of a polyhydric phenol.

4. A solid, fusible adduct as defined in claim 1 wherein the liquid polyglycidyl ether is a liquid polyglycidyl ether of 2,2-bis(p-hydroxyphenyl)propane.

5. A curable composition as defined in claim 2 wherein the polyepoxide is a polyglycidyl ether of a polyhydric phenol.

6. A curable composition as defined in claim 5 wherein the polyglycidyl ether is a polyglycidyl ether of 2,2-bis(p-hydroxyphenyl)propane.

References Cited

UNITED STATES PATENTS

| | | | |
|---|---|---|---|
| 2,801,229 | 7/1957 | De Hoff et al. | 260—47 EPCN |
| 2,853,467 | 9/1958 | Bloom et al. | 260—47 EPCN |
| 2,938,004 | 5/1960 | De Hoff et al. | 260—51 EP |

FOREIGN PATENTS

| | | | |
|---|---|---|---|
| 630,098 | 7/1963 | Belgium | 260—2 EP |

OTHER REFERENCES

Handbook of Epoxy Resins, Lee et al., July 3, 1967 (pp. 13–18; 13–20).

Handbook of Epoxy Resins, Lee et al., July 3, 1967 (pp. 8–15 relied on).

WILLIAM H. SHORT, Primary Examiner

T. E. PERTILLA, Assistant Examiner

U.S. Cl. X.R.

117—127, 161 ZB; 260—2 N, 37 EP, 47 EN, 59, 65, 78.4 EP, 79